US008170375B2

(12) United States Patent
Watanabe

(10) Patent No.: US 8,170,375 B2
(45) Date of Patent: May 1, 2012

(54) IMAGE PROCESSING APPARATUS AND METHOD FOR CONTROLLING THE SAME

(75) Inventor: Takehito Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 887 days.

(21) Appl. No.: 12/169,193

(22) Filed: Jul. 8, 2008

(65) Prior Publication Data
US 2009/0041385 A1 Feb. 12, 2009

(30) Foreign Application Priority Data
Aug. 9, 2007 (JP) .................................. 2007-208327

(51) Int. Cl.
*G06K 9/32* (2006.01)
*G06F 3/00* (2006.01)
*H04N 5/38* (2006.01)
(52) U.S. Cl. ........................... 382/298; 725/38; 348/723
(58) Field of Classification Search .................. 382/298, 382/232, 230, 231; 725/38; 348/723
See application file for complete search history.

(56) References Cited

U.S. PATENT DOCUMENTS

| | | | | |
|---|---|---|---|---|
| 5,996,015 A | * | 11/1999 | Day et al. ....................... 709/226 |
| 6,633,339 B1 | * | 10/2003 | Goto et al. .................. 348/425.4 |
| 7,203,758 B2 | * | 4/2007 | Cook et al. ..................... 709/231 |
| 2002/0133247 A1 | * | 9/2002 | Smith et al. ...................... 700/94 |
| 2002/0191116 A1 | * | 12/2002 | Kessler et al. ................. 348/723 |
| 2009/0265746 A1 | * | 10/2009 | Halen et al. .................... 725/109 |
| 2010/0064316 A1 | * | 3/2010 | Dai et al. .......................... 725/38 |

FOREIGN PATENT DOCUMENTS
JP 2003-58144 2/2003
* cited by examiner

*Primary Examiner* — Brian Q Le
*Assistant Examiner* — Ha Le
(74) *Attorney, Agent, or Firm* — Oblon, Spivak, McClelland, Maier & Neustadt, L.L.P.

(57) ABSTRACT

An image processing apparatus includes an input unit receiving an encoded image data stream; a decoding processor decoding the stream to obtain image data; a first storage storing the image data; a second storage storing the image data and having a storage area storing at least one picture whose size is the largest of image data to be decoded; a controller analyzing the stream and storing the image data in the first and second storages according to an analysis result; and an output unit reading and outputting the stored pictures in a display order. The controller sets storage areas in the first storage according to image size information, stores the image data in the storage areas, determines whether the image size changes according to the analysis result, and, when the image size changes, stores image data of a picture displayed immediately before the image size changes in the second storage.

3 Claims, 8 Drawing Sheets

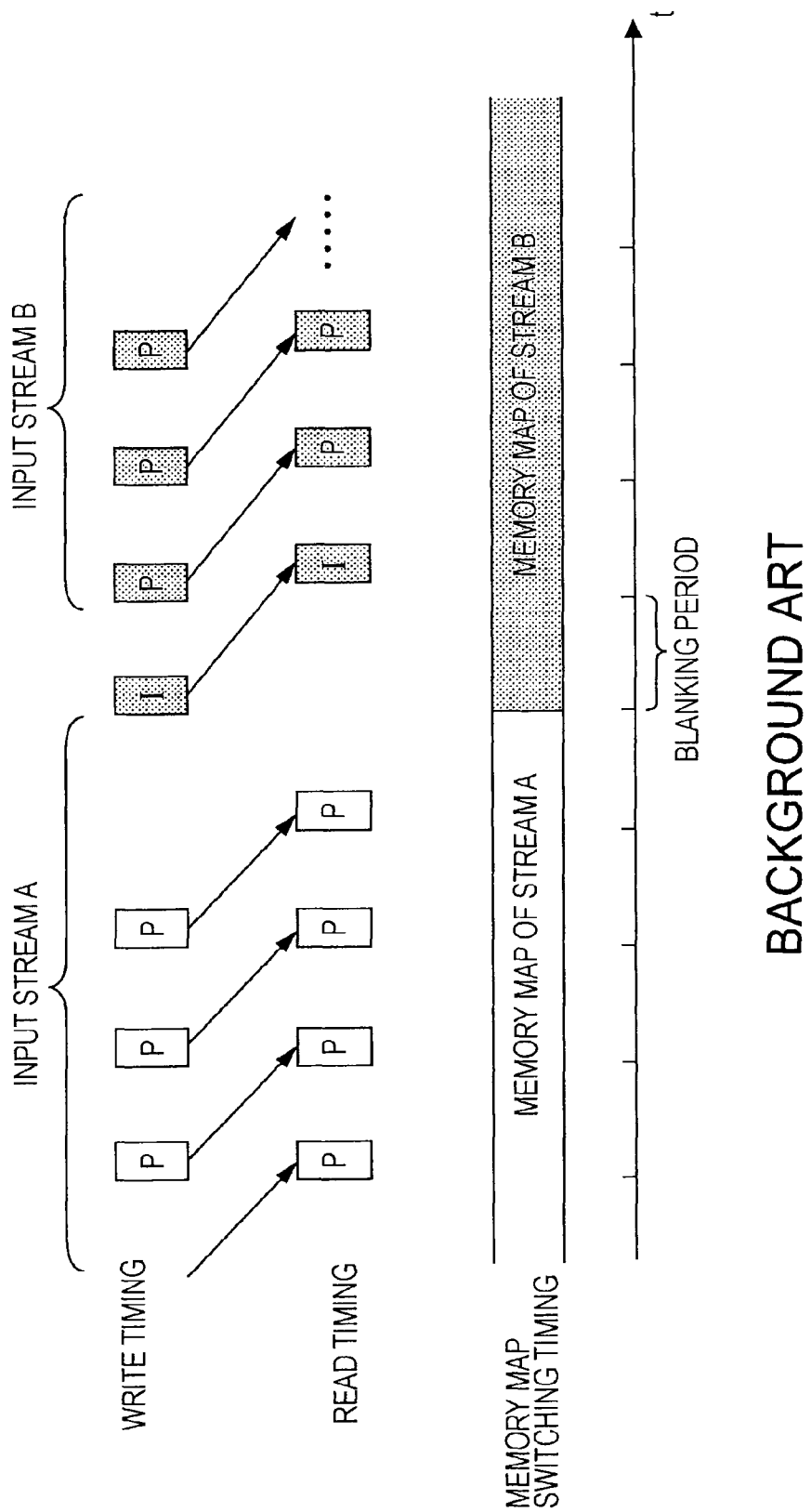

IMAGE PROCESSING APPARATUS AND METHOD FOR CONTROLLING THE SAME

CROSS REFERENCES TO RELATED APPLICATIONS

The present invention contains subject matter related to Japanese Patent Application JP 2007-208327 filed in the Japanese Patent Office on Aug. 9, 2007, the entire contents of which are incorporated herein by reference.

BACKGROUND OF THE INVENTION

1. Field of the Invention

The present invention relates to an image processing apparatus for decoding a stream of encoded image data and outputting decoded image data and a method for controlling the same.

2. Description of the Related Art

Encoding of image data is performed as, for example, a process of efficiently storing image data captured by an imaging apparatus, such as a digital camcorder, on a storage medium, such as a digital versatile disc (DVD), or a process of reducing, when transmitting image data via broadcast waves, the amount of data while keeping the image quality by using redundancy unique to the image data.

Streams generated by encoding image data are decoded by, for example, an image processing apparatus shown in FIG. 6.

An image processing apparatus 200 includes, as shown in FIG. 6, an input unit 210 that receives input streams of encoded image data from the outside of the image processing apparatus 200, a controller 220 that analyzes the input streams, a decoding processor 230 that decodes the input streams, a memory 240 that temporarily stores the decoded image data, and a renderer 250 that reads the image data from the memory 240 and outputs the image data to the outside of the image processing apparatus 200.

The input unit 210 receives an input stream of image data encoded in conformance with an encoding standard, such as the Moving Picture Experts Group (MPEG), and supplies the input stream to the controller 220 and the decoding processor 230.

The controller 220 analyzes the syntax of the input stream which has been received at the input unit 210 and supplies, of information obtained from the analysis result, information on the image size of image data corresponding to the input stream as control information to the memory 240.

The decoding processor 230 decodes the input stream received at the input unit 210 and writes the decoded image data to the memory 240 sequentially on a picture-by-picture basis.

The memory 240 stores the image data supplied from the decoding processor 230 in accordance with a memory map indicating which data should be stored at which storage position. More specifically, the memory 240 sets a memory map in accordance with the information on the image size, which is supplied from the controller 220, and stores data of pictures written by the decoding processor 230 in storage areas.

The renderer 250 reads the decoded image data obtained on a picture-by-picture basis from the memory 240 in accordance with the display order of the image data and outputs the image data to the outside of the image processing apparatus 200.

The image processing apparatus 200 with the foregoing structure performs a process shown in the flowchart of FIG. 7 in order to decode a stream of image data whose image size changes before the end of the stream and stores the decoded image data in the memory 240.

In step S101, the input unit 210 determines whether an input stream to be decoded has been received. When an input stream has been received, the flow proceeds to step S102. When no input stream has been received, the process is terminated.

In step S102, the controller 220 analyzes the input stream received at the input unit 210, and the flow proceeds to step S103.

In step S103, the controller 220 determines whether the image size of image data in the input stream received at the input unit 210 changes on a picture-by-picture basis in accordance with information analyzed in step S102. When the image size changes, the flow proceeds to step S104. When the image size does not change, the flow proceeds to step S105.

In step S104, the controller 220 supplies control information indicating that the image size changes to the memory 240. The memory 240 switches a memory map in accordance with the control information, and the flow proceeds to step S105.

In step S105, the decoding processor 230 decodes the input stream received at the input unit 210 and writes the decoded image data to the memory 240 sequentially on a picture-by-picture basis, and the flow returns to step S101.

In the image processing apparatus 200 which performs the decoding process in accordance with the foregoing steps, for example, as shown in FIG. 8, decoded image data of each picture obtained by the decoding processor 230 is supplied to the memory 240 in synchronization with a write timing. In synchronization with a read timing which is delayed relative to the write timing by, for example, a time corresponding to one picture, the renderer 250 reads the image data stored in the memory 240. In the specific example illustrated in FIG. 8, a stream before the image size change is called an "input stream A", and a stream after the image size change is called an "input stream B". The input streams are assumed to consist solely of intra coded (I) pictures and predicted (P) pictures each of which performs no backward prediction with reference to the following picture in the display order.

In the image processing apparatus 200, this delay in timing is taken into consideration. After the renderer 250 reads from the memory 240 image data of a picture displayed at last in the input stream A, decoding of the input stream B starts, including switching of the memory map. This is performed to prevent the image data of the picture displayed at last in the input stream A from being overwritten by image data in the input stream B, which is written on the basis of the switched memory map.

Therefore, in the image processing apparatus 200, there is a blanking period in which the renderer 250 is incapable of outputting image data of pictures, which are arranged in the display order, to the outside at the time the image size changes. In the specific example shown in FIG. 4, a blanking period taking a display time corresponding to one picture occurs at the time the memory map is switched. Therefore, a display apparatus that displays a video image represented by image data output from the image processing apparatus 200 is incapable of displaying a video image without interruption, that is, without involving the foregoing blanking period at the time the image size changes.

The image processing apparatus 200 can perform the decoding process while avoiding the occurrence of a blanking period by increasing the storage capacity of the memory 240 as in the following exemplary manner, without changing the memory map at the time the image size changes.

For example, when encoding is performed in the Advanced Video Coding (AVC), level 4.0, 4:2:0 format, decoding of encoded streams which have a standard definition (SD) size (image size of 720×480 pixels indicating luminance) and a high definition (HD) size (image size of 1920×1088 pixels indicating luminance) involves the following numbers of memory faces in the memory 240. The number of memory faces indicates the number of storage areas for storing pictures.

When it is assumed that the storable capacity of the memory 240 before the change is 12288×1024 bytes, the number of memory faces corresponding to SD-sized image data is approximately 16 (12299×1024 [bytes]/720×480×1.5 [bytes]). The number of memory faces corresponding to HD-sized image data is 4 (12299×1024 [bytes]/1920×1088×1.5 [bytes]).

Accordingly, the memory size in which items of image data can be sequentially written but not overwritten without switching the memory map is a memory size ensuring the image size and the number of frame faces satisfying both cases (SD size and HD size). More specifically, the memory size is 50135040 bytes (1920×1088×1.5×16). This memory size is four times larger than the memory size before the change at which the memory map is switched.

Therefore, in order to enable the image processing apparatus 200 to perform the decoding process without switching the memory map at the time the image size changes and without involving any blanking period, it is necessary to significantly increase the memory size, resulting in an unavoidable increase in the cost.

Japanese Unexamined Patent Application Publication No. 2003-58144 describes, in order to reduce the processing load on an image processing device and to prevent image quality deterioration of a display image, an image display control apparatus for alternately storing items of generated display data in first and second memory sections, sequentially reading the items of display data in the display order, and displaying a display image.

SUMMARY OF THE INVENTION

It is desirable to provide an image processing apparatus that suppresses an increase in the storable capacity of a storage unit that temporarily stores decoded image data before the decoded image data is output and that outputs the decoded image data without interruption in the display order even when the image size changes in a stream to be decoded.

According to an embodiment of the present invention, there is provided an image processing apparatus including the following elements: input means for receiving an input stream of encoded image data; decoding processing means for decoding the input stream received at the input means to obtain decoded image data of pictures; first storage means for storing the decoded image data of the pictures obtained by the decoding processing means; second storage means for storing the decoded image data obtained by the decoding processing means, the second storage means having a storage area capable of storing at least one picture of image data whose image size is the largest of image data to be decoded by the decoding processing means; control means for analyzing the input stream received at the input means and storing the decoded image data obtained by the decoding processing means in the first storage means and the second storage means in accordance with an analysis result; and output means for reading and outputting, in a display order, the pictures of the image data stored by the control means in the first storage means and the second storage means. The control means sets a plurality of storage areas in the first storage means in accordance with information on the image size of the image data corresponding to the input stream, the information being obtained from the analysis result, stores the decoded image data of the pictures which are sequentially obtained by the decoding processing means in the set plurality of storage areas, determines whether the image size of the image data in the input stream changes in accordance with the analysis result, and, when the image size changes, stores, of the decoded image data obtained by the decoding processing means, image data of a picture displayed immediately before the image size changes in the second storage means.

According to another embodiment of the present invention, there is provided a control method for an image processing apparatus for decoding an input stream of encoded image data received at input means and outputting decoded image data, including the steps of decoding the input stream received at the input means to obtain decoded image data of pictures; analyzing the input stream received at the input means to obtain information on an image size of the image data corresponding to the input stream and determining whether the image size of the image data in the input stream received at the input means changes; setting a plurality of storage areas in first storage means in accordance with the image size obtained by analyzing the input stream, and storing the decoded image data obtained by decoding the input stream sequentially on a picture-by-picture basis in the set plurality of storage areas; storing, in accordance with a result of determining whether the image size of the image data in the input stream changes, of the decoded image data obtained by decoding the input stream, image data of a picture displayed immediately before the image size changes in second storage means having a storage area capable of storing at least one picture of image data whose image size is the largest of image data to be decoded; and reading and outputting, in a display order, the pictures of the image data stored in the first storage means and the second storage means.

According to the embodiments of the present invention, whether the image size of image data in an input stream received at input means changes is determined in accordance with the result of analyzing the input stream. Of decoded image data, data of a picture displayed immediately before the image size changes is stored in second storage means. While the image data is being read from the second storage means, encoded image data after the image size change can be stored in first storage means. Accordingly, while the storage capacity of storage means temporarily storing decoded image data before the decoded image data is output is prevented from increasing, decoded image data can be output in the display order without interruption even when the image size changes in a stream to be decoded.

BRIEF DESCRIPTION OF THE DRAWINGS

FIG. 8 is a chart illustrating a memory-map switching process in the image processing apparatus of the related art.

DESCRIPTION OF THE PREFERRED EMBODIMENTS

Preferred embodiments of the present invention will now herein be described in detail with reference to the drawings.

Figure 1:
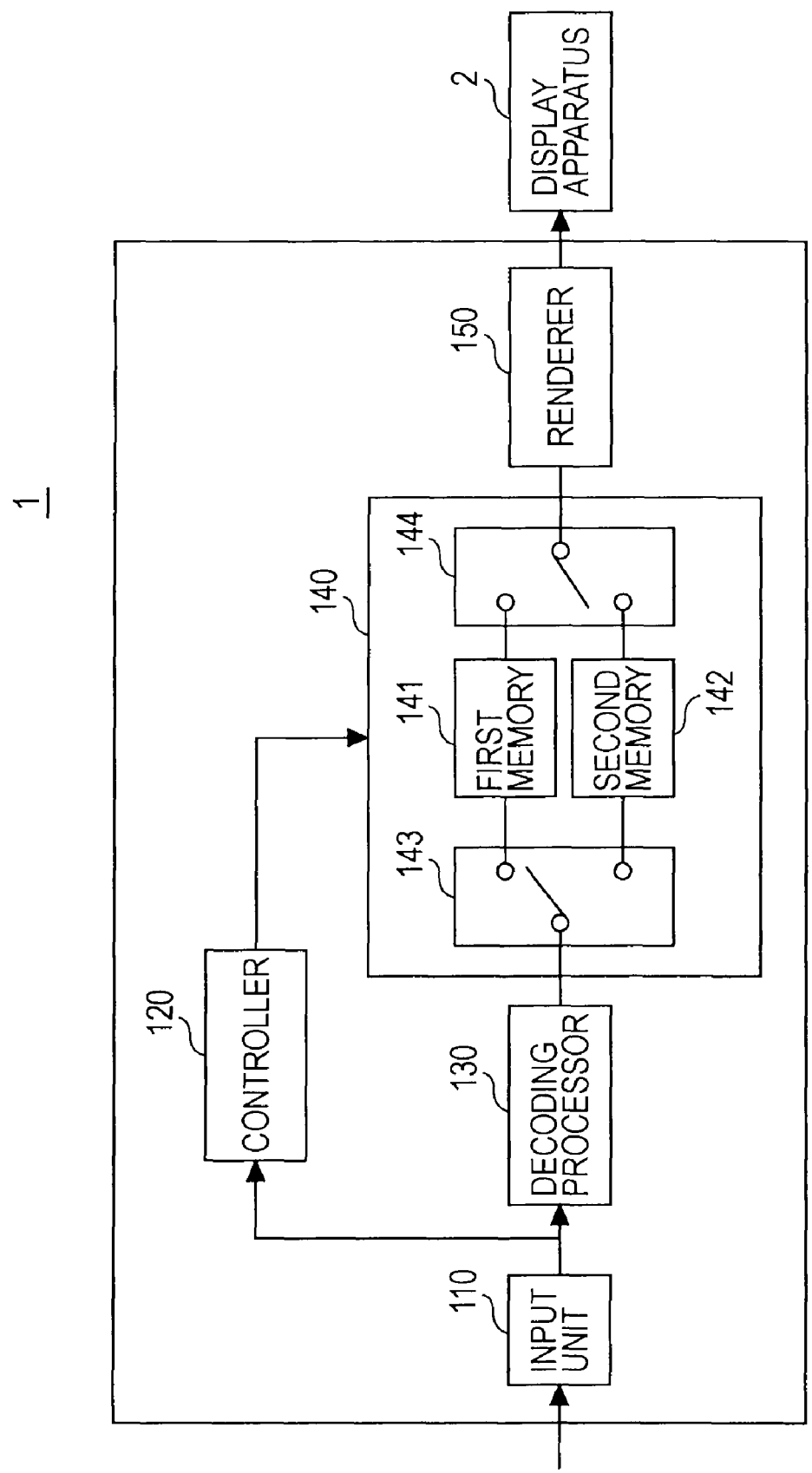
FIG. 1 is a block diagram of an example of an image processing apparatus according to an embodiment of the present invention.

An embodiment of the present invention is described by using an image processing apparatus 1 shown in FIG. 1 as an example of an image processing apparatus for decoding a stream of encoded image data and outputting decoded image data according to an embodiment of the present invention.

The image processing apparatus 1 decodes a stream of encoded image data in, for example, the AVC format to obtain decoded image data such as a baseband video signal and supplies the decoded image data to a display apparatus 2. In order to do so, the image processing apparatus 1 has the following elements.

That is, referring to FIG. 1, the image processing apparatus 1 includes an input unit 110 that receives input streams of encoded image data from the outside of the image processing apparatus 1, a controller 120 that analyzes the input streams and performs a control operation in accordance with the analysis result, a decoding processor 130 that decodes the input streams, a memory unit 140 that temporarily stores decoded image data, and a renderer 150 that reads the image data from the memory unit 140 and outputs the image data to the outside of the image processing apparatus 1.

The input unit 110 receives an input stream of image data encoded in conformance with an encoding standard, such as MPEG, and supplies the input stream to the controller 120 and the decoding processor 130.

The controller 120 analyzes the syntax of the input stream which has been received at the input unit 110 and supplies, of information obtained from the analysis result, at least information on the image size of image data corresponding to the input stream as control information to the memory unit 140.

The decoding processor 130 decodes the input stream received at the input unit 110 and writes decoded image data to the memory unit 140 sequentially on a picture-by-picture basis.

The memory unit 140 includes a first memory 141, a second memory 142, a first switch 143, and a second switch 144. The memory unit 140 temporarily stores the image data supplied from the decoding processor 130 in accordance with the control information supplied from the controller 220.

The first memory 141 stores the image data supplied from the decoding processor 130 via the first switch 143, which is described later, in accordance with a memory map indicating which data should be stored at which storage position. More specifically, the first memory 141 sets a memory map in accordance with the information on the image size, which is supplied from the controller 120, and stores the image data, which is supplied from the decoding processor 130 sequentially on a picture-by-picture basis, in storage areas.

The second memory 142 has a storage area that can store, for example, at least one picture of decoded image data whose image size is the largest of image data to be decoded by the decoding processor 130. The second memory 142 with such a storage area stores the image data supplied from the decoding processor 130 via the first switch 143.

The first switch 143 switches the supply destination to which the image data from the decoding processor 130 is supplied between the first memory 141 and the second memory 142 in accordance with the control information supplied from the controller 120.

The second switch 144 switches the memory source from which the image data is read by the renderer 150, which is described later, between the first memory 141 and the second memory 142 in accordance with the control information supplied from the controller 120.

The renderer 150 reads the decoded image data sequentially on a picture-by-picture basis from the memory unit 140 in accordance with the display order of the image data and outputs the image data to the display apparatus 2.

Figure 2:
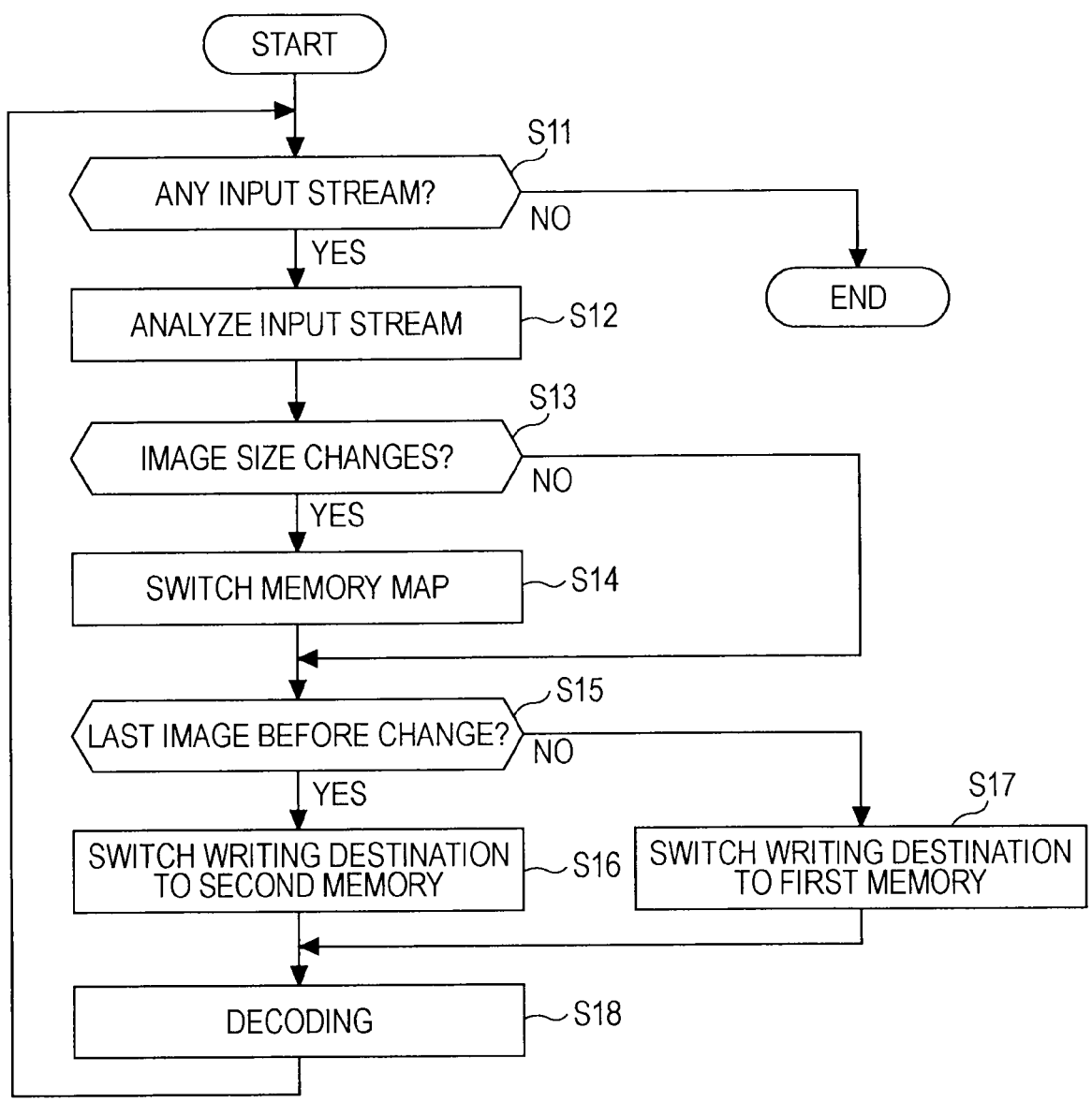
FIG. 2 is a flowchart illustrating a decoding process of decoding a stream in which the image size changes before the end of the stream.

The image processing apparatus 1 with the foregoing structure performs, for a stream in which the image size changes before the end of the stream, a process of storing decoded image data in the first memory 141 or the second memory 142 in accordance with the flowchart shown in FIG. 2.

In step S11, the input unit 110 determines whether an input stream to be decoded has been received from the outside. When an input stream has been received, the flow proceeds to step S12. When no input stream has been received, the process is terminated.

In step S12, the controller 120 analyzes the syntax of the input stream received at the input unit 110, and the flow proceeds to step S13.

In step S13, the memory unit 140 determines whether the image size of image data in the input stream received at the input unit 110 changes on a picture-by-picture basis in accordance with information analyzed by the controller 120 in step S12. When it is determined that the image size changes, the flow proceeds to step S14. When it is determined that the image size does not change, the flow proceeds to step S15.

In step S14, the memory unit 140 switches the memory map of the first memory 141 in accordance with information on the new image size after the change, and the flow proceeds to step S15.

In step S15, the memory unit 140 determines whether the picture to be currently decoded by the decoding processor 130 is the last image before the image size change in accordance with the information analyzed by the controller 120. When the picture is the last image, the flow proceeds to step S16. When the picture is not the last image, the flow proceeds to step S17.

In step S16, the memory unit 140 switches the first switch 143 so that decoded image data of the picture to be currently decoded is supplied to the second memory 142. The flow proceeds to step S18.

In step S17, the memory unit 140 switches the first switch 143 so that decoded image data of the picture to be currently decoded is supplied to the first memory 141. The flow proceeds to step S18.

In step S18, the decoding processor 130 decodes the picture to be currently decoded and supplies the decoded picture to the memory unit 140. The flow returns to step S11.

Figure 3:
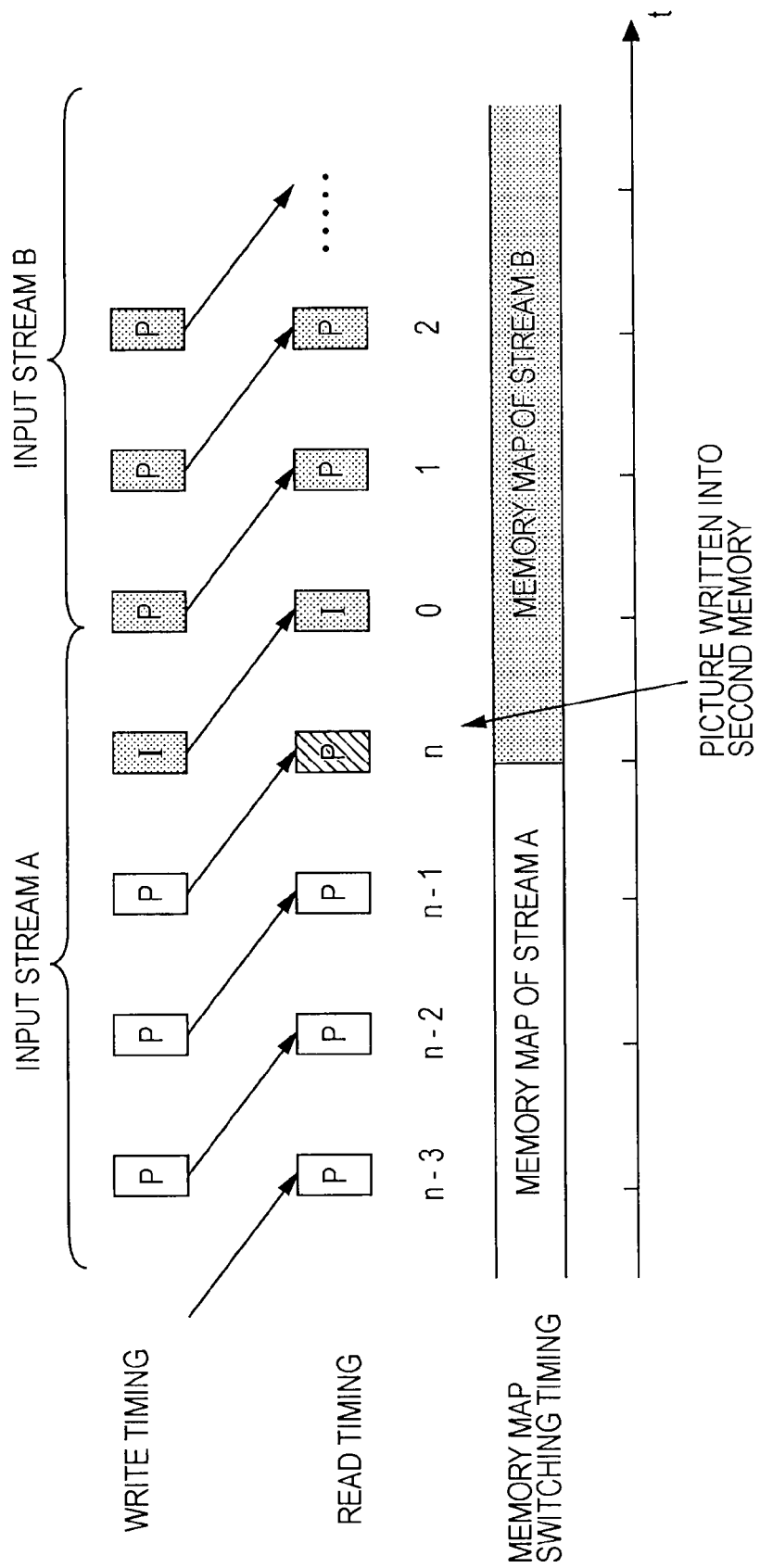
FIG. 3 is a chart illustrating a memory-map switching process in the image processing apparatus according to the present embodiment.

In the image processing apparatus 1 which performs the decoding process in accordance with the foregoing steps, for example, as shown in FIG. 3, decoded image data of each picture obtained by the decoding processor 130 is supplied to the memory unit 140 in synchronization with a write timing. In synchronization with a read timing which is delayed relative to the write timing by, for example, a time corresponding to one picture, the renderer 150 reads the image data stored in the memory unit 140. In the specific example illustrated in FIG. 3, a stream before the image size change is called an "input stream A", and a stream after the image size change is called an "input stream B". The input streams are assumed to consist solely of I pictures and P pictures each of which performs no backward prediction with reference to the following picture in the display order.

In an image processing apparatus of the related art, decoding of the input stream B which is after the image size change is necessary to begin after the memory map is switched. Therefore, there is a blanking period in which a renderer 250 is incapable of outputting image data of pictures, which are arranged in the display order, to the outside at the time the image size changes.

In contrast, in the image processing apparatus 1 according to the present embodiment, the processing step in step S13 determines whether the image size of image data in an input stream received at the input unit 110 changes in accordance with the analysis result, and the processing step in step S16 stores, of decoded image data obtained by the decoding processor 130, data of a picture displayed immediately before the image size change in the second memory 142. Therefore, as shown in FIG. 3, when the renderer 150 is reading the image data from the second memory 142, the image processing apparatus 1 can switch the memory map of the first memory 141 and store decoded image data obtained by the decoding processor 130 after the image size change in the first memory 141. Therefore, the renderer 150 can output image data of pictures arranged in the display order in real-time to an external apparatus, such as the display apparatus 2, regardless of the image size change.

In particular, compared with the image processing apparatus of the related art, the image processing apparatus 1 is only necessary to include the second memory 142, which has a storage area capable of storing at least one picture of decoded image data whose image size is the largest of image data to be decoded by the decoding processor 130. While the memory size is prevented from increasing, decoded image data can be output to the outside in the display order in real-time without interruption even when the image size changes in a stream to be decoded.

In the specific example shown in FIG. 3, the input streams consist solely of I pictures and P pictures which perform no backward prediction. However, in general, image data is encoded in accordance with the GOP structure including B pictures each of which performs backward prediction with reference to the preceding and following pictures in the display order.

Figure 4:
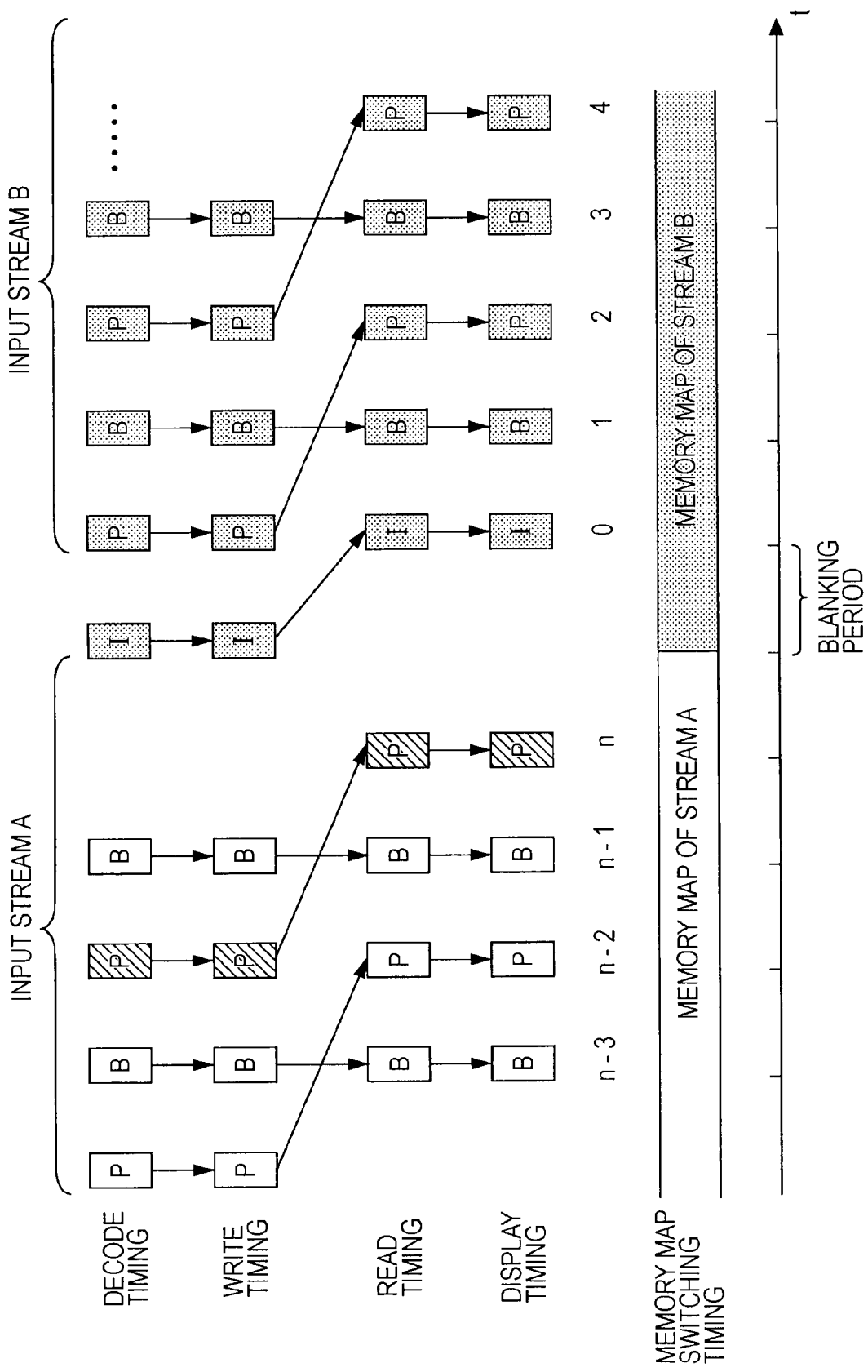
FIG. 4 is a chart illustrating a memory-map switching process in accordance with a Group-of-Pictures (GOP) structure in an image processing apparatus of the related art.

For example, when the image processing apparatus of the related art decodes a stream having a GOP structure including pictures arranged in the order of I, B, P, and B, as shown in FIG. 4, the read timing of a certain P picture is after the read timing of a B picture that is decoded after the P picture. Therefore, when the memory map is switched, the foregoing blanking period may occur over multiple pictures.

Figure 5:
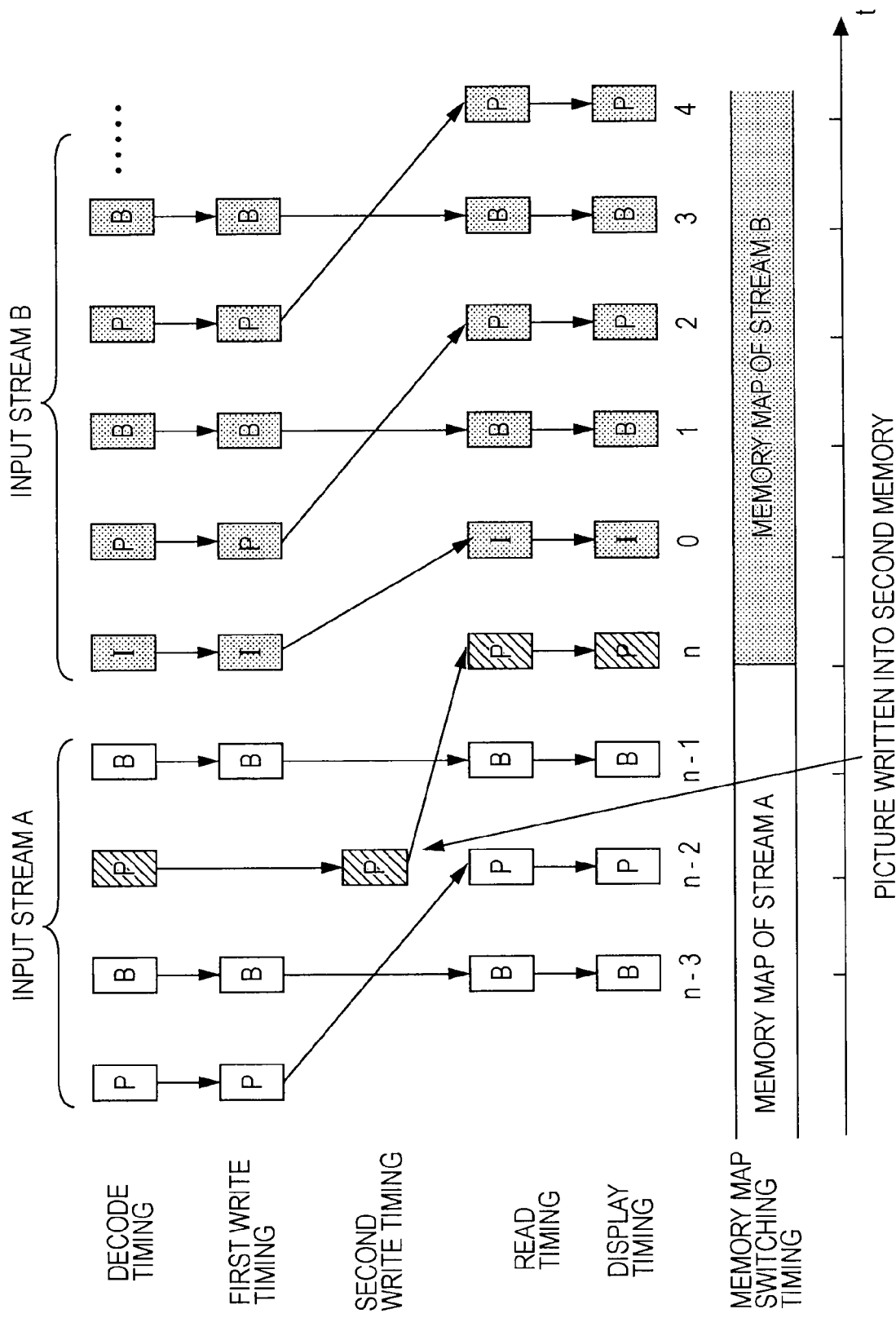
FIG. 5 is a chart illustrating a memory-map switching process in accordance with the GOP structure in the image processing apparatus according to the present embodiment.
Figure 6:
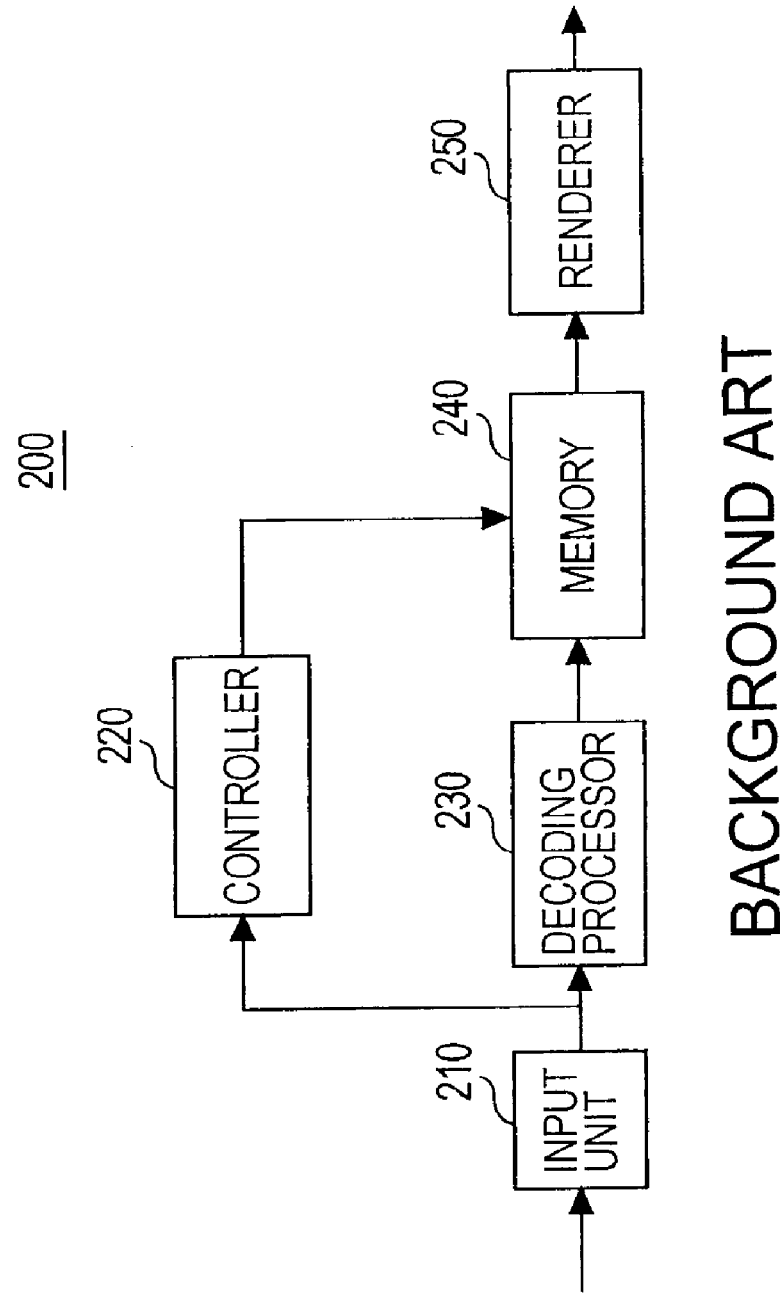
FIG. 6 is a block diagram of an example of an image processing apparatus of the related art.
Figure 7:
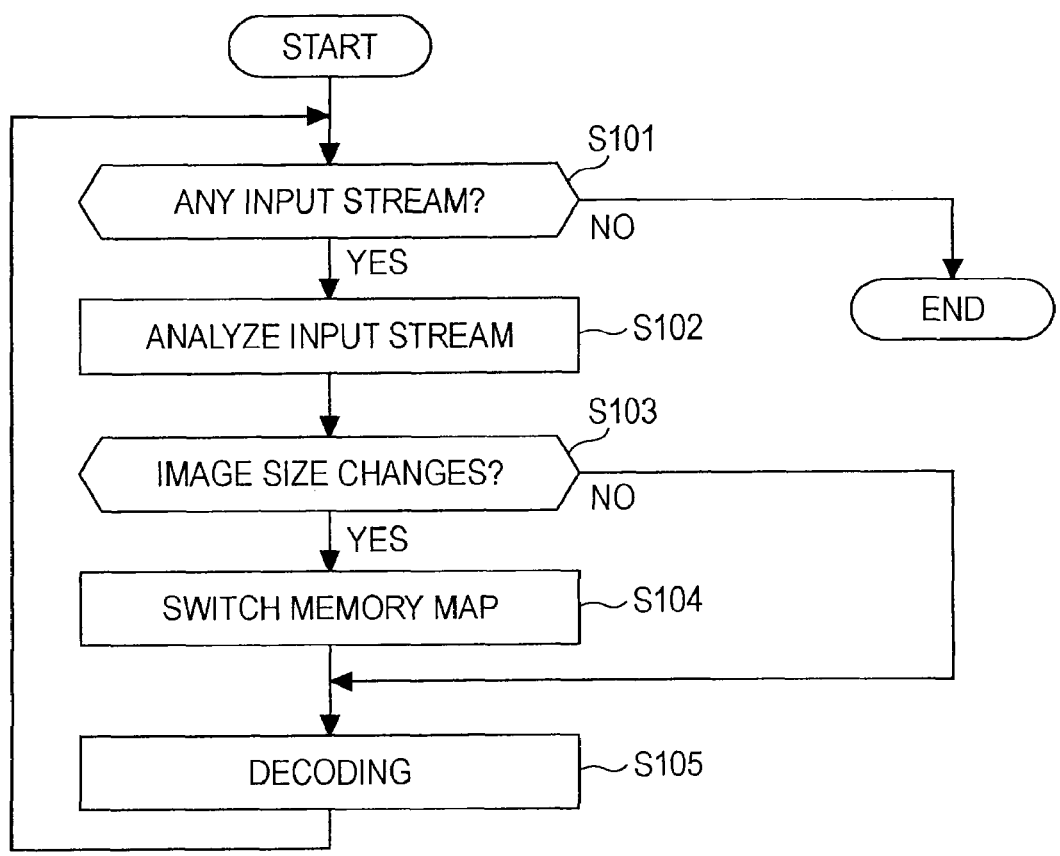
FIG. 7 is a flowchart illustrating a decoding process of the related art of decoding a stream in which the image size changes before the end of the stream.

In contrast, the image processing apparatus 1 according to the present embodiment performs the following process in the foregoing processing steps. As shown in FIG. 5, the input unit 110 receives a stream in which the picture type of each picture is determined in advance in units of GOPs conforming to a predetermined encoding standard, and, even when the image size changes within this stream, the image data can be output in real-time to the display apparatus 2 or the like without involving a blanking period.

That is, referring back to FIG. 2, in step S13, the memory unit 140 determines whether the image size of image data in the input stream received at the input unit 110 changes in units of GOPs, and specifies, in decoded image data obtained by the decoding processor 130, a GOP positioned immediately before the image size change. In step S15, the memory unit 140 determines that data of a picture displayed at last among pictures constituting the GOP specified in step S13 is the picture immediately before the image size change.

In this manner, in the image processing apparatus 1 according to the present embodiment, the input unit 110 receives a stream in which the picture type of each picture is determined in advance in units of GOPs conforming to the predetermined encoding standard. Even when the image size changes in the stream before the end of the stream, the image data can be output to the display apparatus 2 or the like in a continuous manner without involving a blanking period.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   input means for receiving an input stream of encoded image data;
   decoding processing means for decoding the input stream received at the input means to obtain decoded image data of pictures;
   first storage means for storing the decoded image data of the pictures obtained by the decoding processing means;
   second storage means for storing the decoded image data obtained by the decoding processing means, the second storage means having a storage area capable of storing at least one picture of image data whose image size is the largest of image data to be decoded by the decoding processing means;
   control means for analyzing the input stream received at the input means and storing the decoded image data obtained by the decoding processing means in the first storage means and the second storage means in accordance with an analysis result; and
   output means for reading and outputting, in a display order, the pictures of the image data stored by the control means in the first storage means and the second storage means,
   wherein the control means sets a plurality of storage areas in the first storage means in accordance with information on the image size of the image data corresponding to the input stream, the information being obtained from the analysis result, stores the decoded image data of the pictures which are sequentially obtained by the decoding processing means in the set plurality of storage areas, determines whether the image size of the image data in the input stream changes in accordance with the analysis result, and, when the image size changes, stores, of the decoded image data obtained by the decoding processing means, image data of a picture displayed immediately before the image size changes in the second storage means, wherein
   the input means receives the input stream of the image data in which a picture type of each picture is determined in advance on a group-of-pictures-by-group-of-pictures basis, the group of pictures conforming to a predetermined encoding standard, and
   the control means determines, on a group-of-pictures-by-group-of-pictures basis, whether the image size of the image data in the input stream received at the input means changes in accordance with the analysis result, specifies, of the decoded image data obtained by the decoding processing means, a group of pictures positioned immediately before the image size changes, and stores data of a picture displayed at last among pictures constituting the specified group of pictures.

2. A control method for an image processing apparatus for decoding an input stream of encoded image data received at an input and outputting decoded image data, comprising the steps of:
  decoding the input stream received at the input to obtain decoded image data of pictures;
  analyzing the input stream received at the input to obtain information on an image size of the image data corresponding to the input stream and determining whether the image size of the image data in the input stream received at the input changes;
  setting a plurality of storage areas in first storage unit in accordance with the image size obtained by analyzing the input stream, and storing the decoded image data obtained by decoding the input stream sequentially on a picture-by-picture basis in the set plurality of storage areas;
  storing, in accordance with a result of determining whether the image size of the image data in the input stream changes, of the decoded image data obtained by decoding the input stream, image data of a picture displayed immediately before the image size changes in a second storage unit having a storage area capable of storing at least one picture of image data whose image size is the largest of image data to be decoded; and
  reading and outputting, in a display order, the pictures of the image data stored in the first storage means and the second storage means, wherein
  the input receives the input stream of the image data in which a picture type of each picture is determined in advance on a group-of-pictures-by-group-of-pictures basis, the group of pictures conforming to a predetermined encoding standard, and
  the analyzing includes determining, on a group-of-pictures-by-group-of-pictures basis, whether the image size of the image data in the input stream received at the input changes in accordance with the analysis result, specifying, of the decoded image data obtained by the decoding, a group of pictures positioned immediately before the image size changes, and storing data of a picture displayed at last among pictures constituting the specified group of pictures.

3. An image processing apparatus comprising:
  an input unit configured to receive an input stream of encoded image data;
  a decoding processor configured to decode the input stream received at the input unit to obtain decoded image data of pictures;
  a first storage unit configured to store the decoded image data of the pictures obtained by the decoding processor;
  a second storage unit configured to store the decoded image data obtained by the decoding processor, the second storage unit having a storage area capable of storing at least one picture of image data whose image size is the largest of image data to be decoded by the decoding processor;
  a controller configured to analyze the input stream received at the input unit and to store the decoded image data obtained by the decoding processor in the first storage unit and the second storage unit in accordance with an analysis result; and
  an output unit configured to read and output, in a display order, the pictures of the image data stored by the controller in the first storage unit and the second storage unit, wherein
  the controller sets a plurality of storage areas in the first storage unit in accordance with information on the image size of the image data corresponding to the input stream, the information being obtained from the analysis result, stores the decoded image data of the pictures which are sequentially obtained by the decoding processor in the set plurality of storage areas, determines whether the image size of the image data in the input stream changes in accordance with the analysis result, and, when the image size changes, stores, of the decoded image data obtained by the decoding processor, image data of a picture displayed immediately before the image size changes in the second storage unit after the data switch changes to the second storage unit,
  the input unit receives the input stream of the image data in which a picture type of each picture is determined in advance on a group-of-pictures-by-group-of-pictures basis, the group of pictures conforming to a predetermined encoding standard, and
  the control controller determines, on a group-of-pictures-by-group-of-pictures basis, whether the image size of the image data in the input stream received at the input unit changes in accordance with the analysis result, specifies, of the decoded image data obtained by the decoding processor, a group of pictures positioned immediately before the image size changes, and stores data of a picture displayed at last among pictures constituting the specified group of pictures.

* * * * *